(12) United States Patent
Onishi et al.

(10) Patent No.: US 7,637,363 B2
(45) Date of Patent: Dec. 29, 2009

(54) CLUTCH DEVICE FOR AUTOMATIC SPEED CHANGER

(75) Inventors: Hirofumi Onishi, Aichi-gun (JP); Yuji Yasuda, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 460 days.

(21) Appl. No.: 11/579,506

(22) PCT Filed: May 6, 2005

(86) PCT No.: PCT/JP2005/008742

§ 371 (c)(1),
(2), (4) Date: Nov. 3, 2006

(87) PCT Pub. No.: WO2005/108812

PCT Pub. Date: Nov. 17, 2005

(65) Prior Publication Data

US 2007/0215432 A1   Sep. 20, 2007

(30) Foreign Application Priority Data

May 6, 2004 (JP) ............................. 2004-137421

(51) Int. Cl.
*F16D 25/10* (2006.01)
*F16D 25/0638* (2006.01)
(52) U.S. Cl. ............... 192/87.11; 192/48.8; 192/85 AA
(58) Field of Classification Search ............... 192/87.11
See application file for complete search history.

(56) References Cited

U.S. PATENT DOCUMENTS 4,237,749 A * 12/1980 Koivunen .................. 475/281

7,249,665 B2 * 7/2007 Heinrich et al. .......... 192/87.11
2003/0232675 A1   12/2003 Miyazaki et al.

FOREIGN PATENT DOCUMENTS

| CN | 1469054 A | 1/2004 |
|---|---|---|
| JP | 61 77455 U | 5/1986 |
| JP | 63 246541 A | 10/1988 |
| JP | 2003-42184 A * | 2/2003 |
| JP | 2003 106341 A | 4/2003 |
| JP | 2003-130085 | 5/2003 |

* cited by examiner

*Primary Examiner*—Richard M. Lorence
(74) *Attorney, Agent, or Firm*—Oblon, Spivak, McClelland, Maier & Neustadt, L.L.P.

(57) ABSTRACT

A clutch device for an automatic transmission includes a clutch drum, first and second frictional coupling elements, both supported by the clutch drum, a first piston axially movably disposed radially outwardly of the clutch drum and operating to couple the first frictional coupling elements, and a second piston axially movably disposed radially inwardly of the clutch drum and operating to couple the second frictional coupling elements. The clutch drum includes an inner drum portion welded on a rotary shaft, and an outer drum portion welded on the inner drum portion and supporting the first and second frictional coupling elements. The first piston is axially slidable relative to the inner drum portion. The second piston is axially slidable relative to the rotary shaft. And, a welded portion of the rotary shaft and the inner drum portion, and a welded portion of the inner drum portion and the outer drum portion, are radially spaced in a predetermined distance and concentric with each other.

7 Claims, 3 Drawing Sheets

CLUTCH DEVICE FOR AUTOMATIC SPEED CHANGER

TECHNICAL FIELD

The present invention relates to a clutch device for an automatic transmission, especially, to the art for providing the small-size clutch device.

RELATED ART

There is known a clutch device having an arrangement in which a pair of a group of frictional coupling elements is supported by one clutch drum. That is, it is such a clutch device having a piston disposed radially inwardly of the clutch drum to couple a group of frictional coupling elements and another piston disposed radially outwardly of the clutch drum to couple another group of frictional coupling elements, namely, the clutch device having, what is called, a "pull piston".

Patent Document 1, JP 2003-106341 A, for example, discloses such a clutch device for the automatic transmission.

In the clutch device of the automatic transmission disclosed in Patent Document 1, the radially outward piston is the "pull piston", and one of the pair of groups of frictional coupling elements is coupled when the piston is moved away from the clutch drum in the axially direction.

In the clutch device of Patent Document 1, a shaft-like member is splined to a rotary shaft. The shaft-like member functions as an inner drum portion of a clutch drum, which integratedly rotates with the clutch drum. Both the pistons slidably move on the shaft-like member respectively. Accordingly, the shaft-like member is required to have a sufficient length for the pistons to slidably move and the length of the shaft is required to be long. As a result, it causes a disadvantage of providing a substantially large clutch device, namely, a disadvantage that it cannot provide a substantially small clutch device.

The present invention was made in view of the background art described above. It is an object of the present invention to provide a small-size clutch device.

SUMMARY OF THE INVENTION

The object indicated above may be achieved according to a first aspect of the invention, which provides a clutch device for an automatic transmission including (a) a clutch drum, (b) a first frictional coupling elements and a second frictional coupling elements, both of which are supported by the clutch drum, (c) a first piston axially movably disposed radially outwardly of the clutch drum and operating to couple the first frictional coupling elements, (d) a second piston axially movably disposed radially inwardly of the clutch drum and operating to couple the second frictional coupling elements, the clutch device being characterized in that: (e) the clutch drum includes an inner drum portion welded on a rotary shaft, and an outer drum portion welded on the inner drum portion and supporting the first frictional coupling elements and the second frictional coupling elements; (f) the first piston is axially slidable relative to the inner drum portion; and (g) the second piston is axially slidable relative to the rotary shaft.

According to the first aspect of the invention, since the first piston is slidably fitted on the inner drum portion and the second piston is slidably fitted on the rotary shaft, the inner drum portion can be axially shorter than in a case in which both the first and second pistons are fitted on the inner drum portion. Since the inner drum portion and the rotary shaft are welded to each other, then the axial dimension at the connected part is shorter, the inner drum portion can be axially shorter than in a case in which the inner drum portion is splined to the rotary shaft as disclosed in the Patent Document 1. Accordingly, the clutch device can be a small-size one.

The object indicated above may be achieved according to a second aspect of the invention, which provides the clutch device for an automatic transmission according to the first aspect of the invention, characterized in that a welded portion of a rotary shaft and the inner drum portion, and a welded portion of the inner drum portion and the outer drum portion are radially spaced in a predetermined distance and concentric with each other.

According to the second aspect of the invention, since the connecting part of the rotary shaft and the inner drum portion, and that of the inner drum portion and the outer drum portion can be simultaneously welded, the cost for welding can be reduced.

The object indicated above may be achieved according to a third aspect of the invention, which provides the clutch device for an automatic transmission according to the second aspect of the invention, characterized in that a radially inward end portion of the outer drum portion which is welded on the inner drum portion is formed so as to extend in the axial direction.

According to the third aspect of the invention, since the radially inward end portion of the outer drum portion extends in the same direction as the welding depths of the welded portions extend, detecting defects in the welded portion of the outer drum portion and the inner drum portion and the welded portion of the inner drum portion and the rotary shaft from the radially outward point with respect to the radially inward end portion of the outer drum portion can be accomplished.

The object indicated above may be achieved according to a fourth aspect of the invention, which provides the clutch device for an automatic transmission according to the third aspect of the invention, characterized in that the outer drum portion includes an annular convex portion which is concaved in the axial direction and axially extending from the axial position of the radially inward end portion.

According to the fourth aspect of the invention, since the tip portion of the defect detecting probe which detects defects in the welded portion of the outer drum portion and the inner drum portion and the welded portion of the inner drum portion and the rotary shaft can be received in the annular convex portion if the tip portion protrudes toward the tip side from the ultrasonic output portion, the inner cylindrical portion of the outer drum portion can be shorter than in a case in which the tip portion is disposed radially outwardly of the radially inward end portion of the outer drum portion.

The object indicated above may be achieved according to a fifth aspect of the invention, which provides the clutch device for an automatic transmission according to any one of the first to fourth aspects of the invention, characterized in that a lip seal is fixed on the outer drum portion so as to seal a space defined by the outer drum portion and the first piston.

According to the fifth aspect of the invention, the lip seal fixed on the outer drum portion seals a space defined by the first piston and the outer drum portion. On the other hand, as Patent Document 1 discloses, in the case that an O-ring is employed for sealing a space defined by the first piston and the outer drum portion, a thick portion for receiving the O-ring is required and, therefore, the axial dimension must be long due to the thick portion. In the case of the fifth aspect of the invention, since such a thick portion is not required, the axial dimension of the outer drum portion can be shorter. Accordingly, the clutch device can be a smaller-size one.

The object indicated above may be achieved according to a sixth aspect of the invention, which provides the clutch device for an automatic transmission according to any one of the first to fifth aspects of the invention, characterized in that a lip seal is fixed on the second piston to seal a space defined by the second piston and the outer drum portion, and a lip seal is fixed on the second piston so as to seal a space defined by the second piston and the rotary shaft.

According to the sixth aspect of the invention, since the lip seals fixed on the second piston, respectively, seal a space defined by the outer drum portion and the second piston and a space defined by the rotary shaft and the second piston, the axial dimensions of the second piston can be shorter. Accordingly, the clutch device can be a smaller-size one.

The object indicated above may be achieved according to a seventh aspect of the invention, which provides the clutch device for an automatic transmission according to the fourth aspect of the invention, characterized in that the first piston is slidably received on an outer surface of the annular convex portion of the outer drum portion, and the second piston is slidably received on an inner surface of the annular convex portion of the outer drum portion.

According to the seventh aspect of the invention, since the first piston and the second piston are slidably and directly received on the opposite surfaces, respectively, of the clutch drum the clutch device can be a small-size one.

The object indicated above may be achieved according to an eighth aspect of the invention, which provides the clutch device for an automatic transmission according to any one of the first to seventh aspects of the invention, characterized in that: the first frictional coupling elements and the second frictional coupling elements are disposed in the clutch drum, each of them is axially spaced in a predetermined distance to each other; the first piston is brought into pressing contact with the first coupling elements when the first piston is axially moved away from the second piston; and the second piston is brought into pressing contact with the coupling elements when the second piston is moved away from the first piston.

According to the eighth aspect of the invention, with the first and second pistons which are disposed respectively on one of the opposed sides of the clutch drum to each other, the first and second frictional coupling elements which are disposed in the clutch drum, each of them is axially spaced in a predetermined distance to each other, can operate to be coupled.

DETAILED DESCRIPTION OF EXEMPLARY EMBODIMENTS

Figure 1:
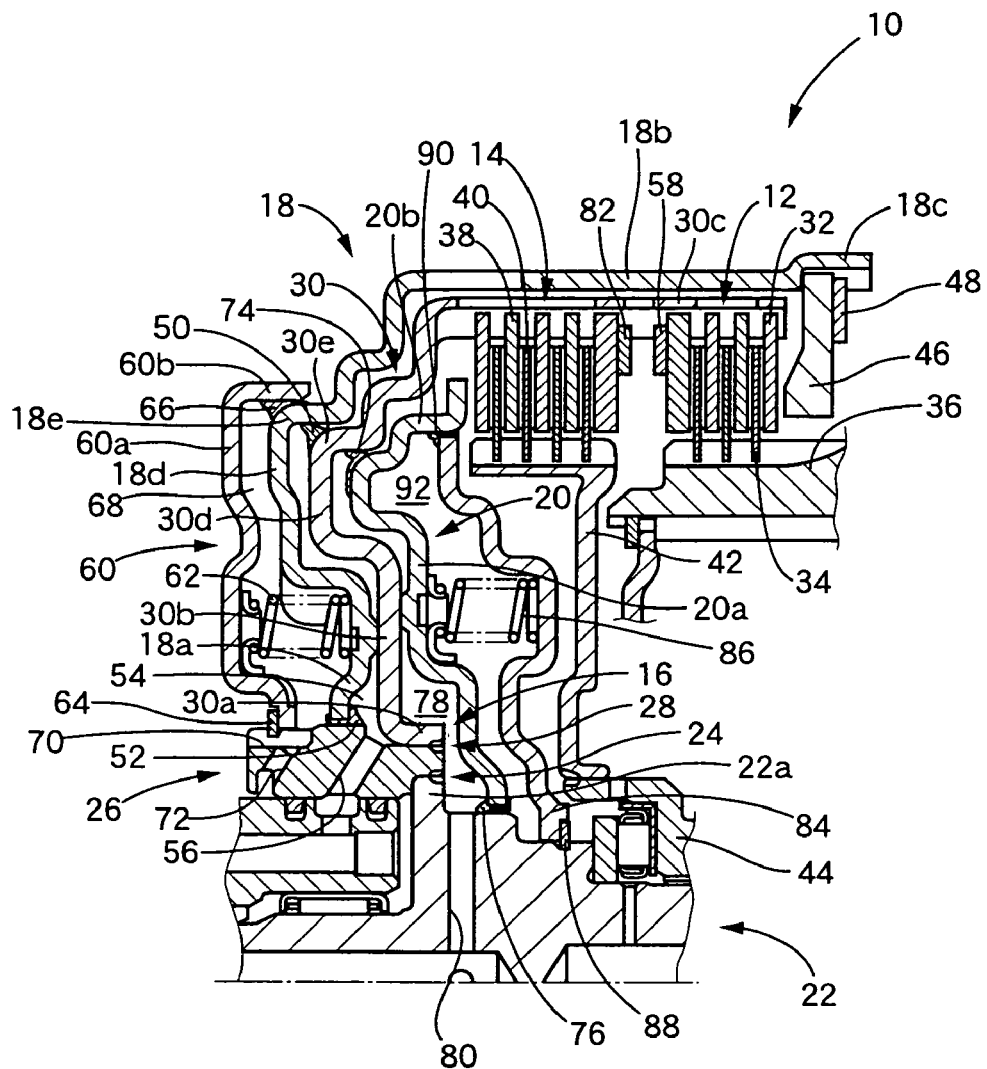
FIG. 1 is a sectional view of a part of the automatic transmission including the clutch device according to the present invention.

Hereinafter, there will be described the present invention by reference to the drawings. FIG. 1 is a sectional view showing a part of an automatic transmission for a vehicle including a clutch device 10 constructed according to the present invention, in more detail, the upper half part divided by the axis which is represented by an alternate long and short dashed line.

The clutch device 10 includes a clutch drum 16 supporting first frictional coupling elements 12 and second frictional coupling elements 14, a first piston 18 disposed radially outwardly of the clutch drum 16 which has a cylindrical shape with a bottom so as to cover the clutch drum 16, and a second piston 20 disposed radially inwardly of the clutch drum 16. The second frictional coupling elements 14 are disposed apart from the first frictional coupling elements 12 in a predetermined distance in the axial direction.

The clutch drum 16 includes an inner drum portion 26 and an outer drum 30. The inner drum portion 26 and an input shaft 22 as a rotary shaft are welded to each other at the first welded portion. And the outer drum portion 30 and the inner drum portion 26 are welded to each other at the second welded portion. The first welded portion and the second welded portion are radially spaced in a predetermined distance and concentric with each other. The input shaft 22 is a turbine shaft of a torque converter rotated by a drive power source such as an engine.

The inner drum 26 is a cylindrical member which is disposed radially inwardly of the first piston 18. The input shaft 22 has a flange portion 22a which radially outwardly extends. An end face of the first piston 18 on the side of the second piston 20 is flush with a face of the flange portion 22a on the side of the second piston 20. The first welded portion 24 is formed at the radially outer end of a face of the flange portion 22a which is on the side of the second piston 20 and at the inner circumferential end of a face of the inner drum portion 26 which is on the side of the second piston 20.

The outer drum portion 30 is a cylindrical member having a bottom which is open at one axial end thereof in the axial direction, which is concentric with the axis of the input shaft 22, which is formed by pressing a steel plate and which includes an inner cylindrical portion 30a as an inner circumferential end portion, an annular bottom portion 30b, and an outer cylindrical portion 30c. The annular bottom portion 30b has a radially inner end connected to the inner cylindrical portion 30a, and the outer cylindrical portion 30c is connected to a radially outer end of the annular bottom portion 30b. Each of the inner cylindrical portion 30a and the outer cylindrical portion 30c has a cylindrical shape in which the centerlines thereof are congruent with the axis of the input shaft 22.

The inner cylindrical portion 30a is fitted on the outer circumference of the inner drum portion 26, and the end face of the inner cylindrical portion 30a which is on the side of the second piston 20 is flush with the corresponding end face of the inner drum portion 26 which is on the side of the second piston 20. The second welded portion 28 is formed at the inner circumferential end of the face of the inner cylindrical portion 30a. Accordingly, the first welded portion 24 and the second welded portion 28 are formed side by side in the radial direction so that they appear overlapped as viewed from the radially outer direction. And each of the first welded portion 24 and the second welded portion 28 is formed by such as the laser beam welding such that the weld depth direction of the welded portion extends as parallel to the axial direction of the input shaft 22. The length of the inner cylindrical portion 30a in the axial direction is longer than that of the weld depth of each of the first and second welded portions 24, 28.

The annular bottom portion 30b extends generally perpendicularly to the axial direction and in the radial direction of the input shaft 22, and is connected at its radially inner end to the axial end of the inner cylindrical portion 30a which is on the side of the first piston 18. And the annular bottom portion 30b includes an annular convex portion 30d which has a substantially U-shape in the sectional view in the slightly outer position from the intermediate point in the radial direction. The annular convex portion 30d shows a convex appearance in the axial direction and extends, on the side of the first piston 18, from the end portion of the inner cylindrical portion 30a which is on the side of the first piston 18 in the axial direction. That is, the annular convex portion 30d shows a concave appearance in the axial direction as viewed from the side of the second piston 20.

Figure 2:
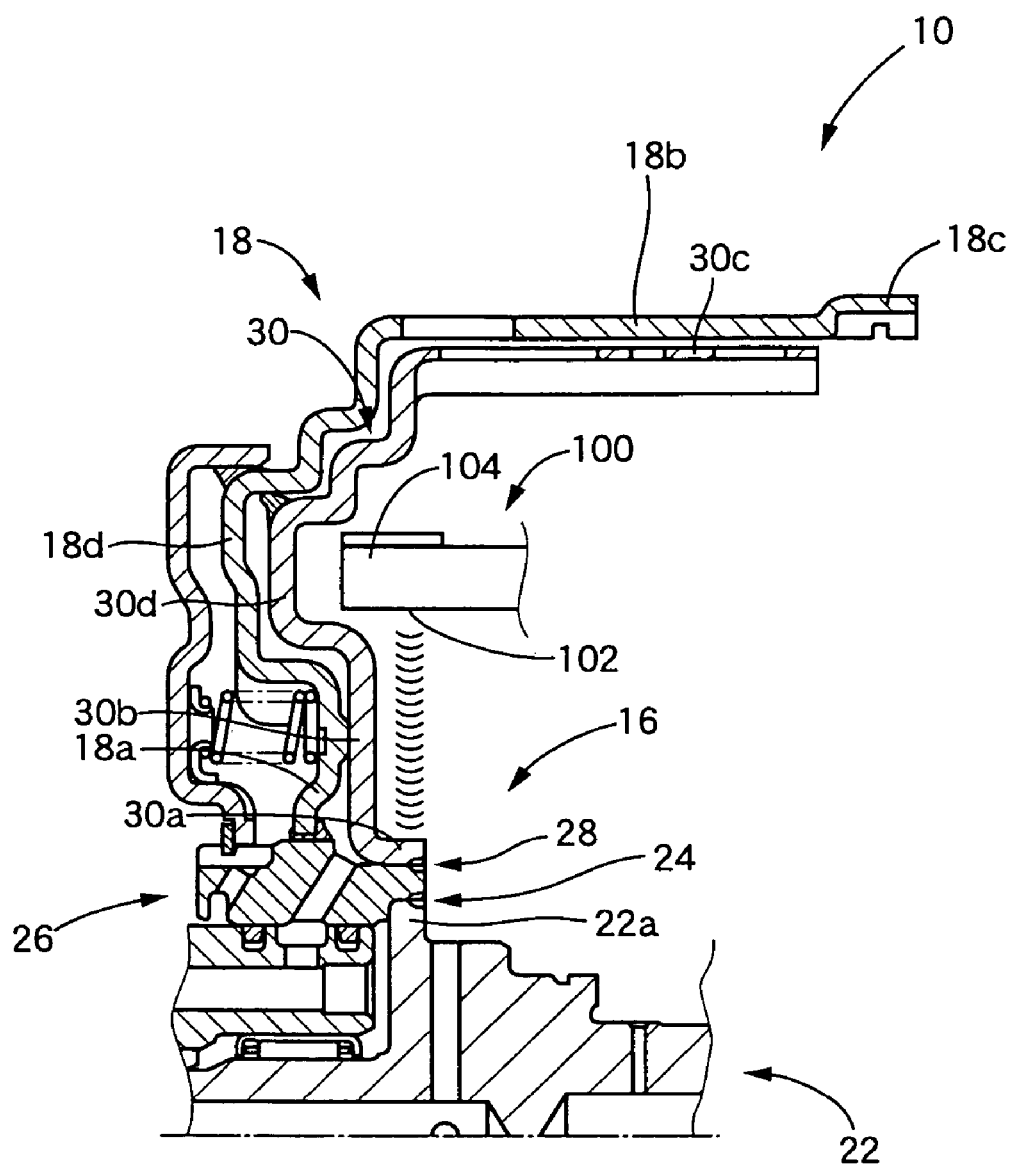
FIG. 2 illustrates a defect detecting probe located radially outwardly of the inner cylindrical portion of the outer drum portion in order to detect defects in the first and second welded portions.

FIG. 2 illustrates a part of the clutch device 10 with a defect detecting probe 100 located radially outwardly of the inner cylindrical portion 30a of the outer drum portion 30 for detecting defects in the first and second welded portions 24, 28. The defect detecting probe 100 is disposed such that its tip portion 104 is received in the concave of the annular convex portion 30d which is on the opposite side of the first piston in the axial direction in FIG. 2. The tip portion 104 is at the tip of the defect detecting probe 100 and on the tip side from the ultrasonic output portion 102. The annular convex portion 30d is formed in the annular bottom portion 30b of the outer drum portion 30. In this way, the ultrasonic output portion 102 emits an ultrasonic wave toward the first and second welded portions 24, 28 for detecting defects in the first and second welded portions 24, 28.

In FIG. 1 the outer cylindrical portion 30c of the outer drum portion 30 extends from the annular bottom portion 30b in the axial direction to the side of the second piston 20. The outer cylindrical portion 30c relatively unrotatably holds a plurality of inwardly extending friction plates 32 of the first frictional coupling elements 12, such that the friction plates 32 are splined to a portion of the inner circumferential surface of the outer cylindrical portion 30c, which portion is relatively near the axial open end of the outer cylindrical portion 30c. The first frictional coupling elements 12 consist of the above-described plurality of inwardly extending friction plates 32, and plurality of outwardly extending friction plates 34 each of which is interposed between the adjacent two inwardly extending friction plates 32. The plurality of outwardly extending friction plates 34 are relatively unrotatably splined to the radially outer surface of a ring gear 36 functioning as a clutch hub.

The outer cylindrical portion 30c of the outer drum portion 30 also holds a plurality of inwardly extending friction plates 38 of the second frictional coupling elements 14, such that the friction plates 38 are relatively unrotatably splined to a portion of the inner circumferential surface which is nearer the annular bottom portion 30b than to the portion at which the friction plates 32 are supported. The second frictional coupling elements 14 consists of the above-described plurality of inwardly extending friction plates 38, and a plurality of outwardly extending friction plates 40 each of which is interposed between the adjacent two inwardly extending friction plates 38. These outwardly extending friction plates 40 are relatively unrotatably splined to the radially outer surface of a clutch hub 42 which is substantially perpendicularly disposed to the input shaft 22. This clutch hub 42 is fixed at its radially inner end to a sun gear 44, so that the clutch hub 42 is rotated with the sun gear 44.

The first piston 18 is a pressed member which is formed by pressing a steel plate, and consists of an annular bottom portion 18a, a cylindrical portion 18b and a cylindrical axial extension 18c. The cylindrical portion 18b is connected to a radially outer end of the annular bottom portion 18a, so as to cover the outer cylindrical portion of the outer drum portion 30. The cylindrical axial extension 18c has a cylindrical shape, is connected to the cylindrical portion 18b, and extends axially outwardly of the outer drum portion 30. The axial extension 18c has a splined inner circumferential surface having the same inside diameter as the inner circumferential surface of the cylindrical portion 18c.

A presser member 46 in the form of an annular plate is splined at its radially outer end to the splined inner circumferential surface of the cylindrical axial extension 18c. The presser member 46 is held at one of its opposite annular surfaces with the end face of the cylindrical portion 18b of the first piston 18, and at the other annular surface with a retainer ring 48 fixed to the inner circumferential surface of the cylindrical axial extension 18c, so that the pressure member 46 is not movable relative to the first piston 18 in both of the circumferential and axial directions.

On the annular bottom portion 18a is formed an annular concave portion 18d which is slidably fitted on and covers the radially outer surface of the annular convex portion 30d of the outer drum portion 30. A lip seal 50 of rubber is vulcanized and fixed on the radially outer surface of the radially outer corner portion 30e in the annular convex portion 30d of the outer drum portion 30 so that the lip seal 50 seals a space defined by the annular concave portion 18d of the first piston 18 and the annular convex portion 30d of the outer drum portion 30.

The first piston 18 is axially slidable at its inner circumferential surface on the radially outer surface of the inner drum portion 26. A lip seal 52 of rubber is fixed on the inner circumferential surface of the first piston 18 to seal a space defined by the inner circumferential surface of the first piston 18 and the inner drum portion 26. The annular bottom portion 18a of the first piston 18 and the annular bottom portion 30b of the outer drum portion 30 cooperate to define therebetween a first hydraulic pressure chamber 54. When a working oil is fed to the first hydraulic pressure chamber 54 through an oil hole 56 formed through the inner drum portion 26, the first piston 18 is moved in the axial direction that causes the annular bottom portion 18a is moved away from the annular bottom portion 30b of the outer drum portion 30. As a result, the presser member 46 fixed to the axial extension 18c of the first piston 18 is brought into pressing contact with the first frictional coupling elements 12. A retainer ring 58 is fixed to the outer cylindrical portion 30c of the outer drum portion 30 such that the retainer ring 58 is located on one side of the first frictional coupling elements 12 which is remote from the presser member 46. The retainer ring 58 is provided to prevent an axial movement of the first frictional coupling elements 12 toward the second frictional coupling elements 14. In this arrangement, the inwardly extending friction plates 32 and outwardly extending friction plates 34 of the first frictional coupling elements 12 are forced against each other when the first frictional coupling elements 12 are pressed by the presser member 46.

On one of opposite axial sides of the first piston 18 which is remote from the first hydraulic pressure chamber 54, there is disposed a disciform or disc-type or disc-shape balancer wall 60 such that the balancer wall 60 is fitted on the radially outer surface of the inner drum portion 26. The balancer wall 60 consists of an annular plate portion 60a substantially perpendicular to the axis of the inner drum portion 26, and a cylindrical portion 60b which is connected to a radially outer end of the annular plate portion 60a such that the cylindrical portion 60b extends towards the first piston 18. A return spring 62 is interposed between the annular plate portion 60a and the annular bottom portion 18a of the first piston 18, to bias the annular plate portion 60a and annular bottom portion 18a in opposite axial directions away from each other. A retainer ring 64 is fixed to the radially outer surface of the inner drum portion 26, and the balancer wall 60 is held at its radially inner end in abutting contact with the retainer ring 64, at one of its opposite surfaces of the balancer wall 60 which is remote from the first piston 18. Accordingly, the balancer wall 60 is prevented from moving in the axial direction away from the first piston 18.

The radius of the radially inner surface of the cylindrical portion 60b is slightly larger than that of the radially outer surface of the annular concave portion 18d of the first piston 18. A lip seal 66 of rubber is fixed on the radially outer surface of the radially outer corner portion 18e in the annular concave portion 18d so that the lip seal 66 seals a space defined by the cylindrical portion 60d of the balancer wall 60 and the annular concave portion 18d of the first piston 18 to form a second hydraulic pressure chamber 68 between the balancer wall 60 and the annular bottom portion 18a of the first piston 18.

Figure 3:
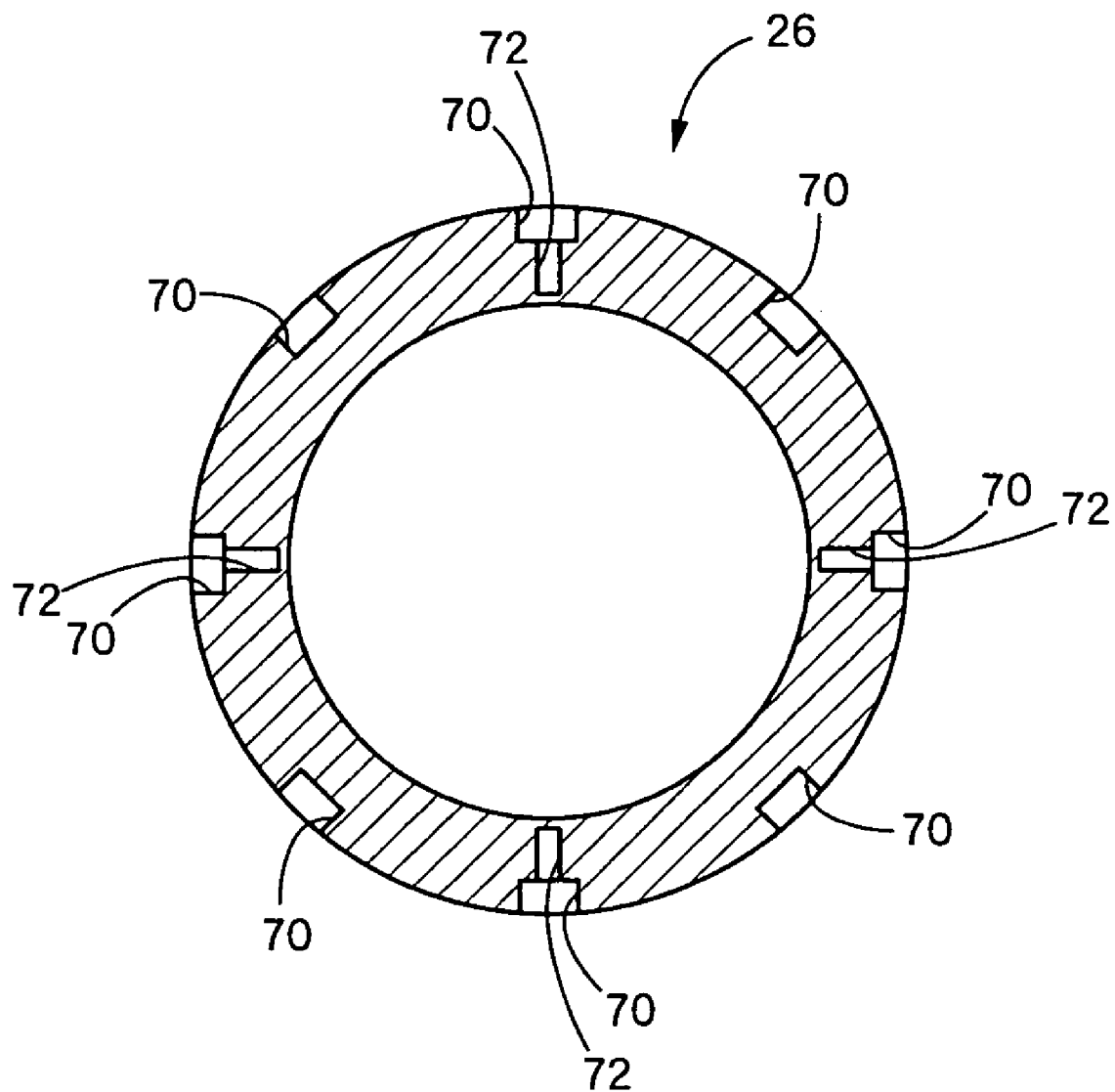
FIG. 3 is a sectional view of the inner drum portion that is radially cut so as to include axial grooves.

The inner drum portion 26 has axial grooves 70 formed in a portion thereof on which the balancer wall 60 is fitted. The axial grooves 70 are formed so as to extend in the axial direction of the inner drum portion 26, for communication of the second hydraulic pressure chamber 68 with a space formed outwardly of the balancer wall 60 (on one of opposite sides of the balancer wall 60, which is remote from the second hydraulic pressure chamber 68). As shown in FIG. 3 the eight axial grooves 70 are formed such that the axial grooves 70 are equally spaced from each other in the circumferential direction of the inner drum portion 26 in this embodiment. FIG. 3 is a sectional view illustrating a section which is cut in the radial direction of the inner drum portion 26 so as to include the axial grooves 70.

The inner drum portion 26 further has oil holes 72 each of which is open at one end communicated with the second hydraulic pressure chamber 68 to the corresponding one of the axial grooves 70. As shown in FIG. 3 the oil holes 72 is not provided for all of the axial grooves 70, but the oil hole or holes 72 may be provided for a selected one or ones (for example, four holes 72 in FIG. 3) of the axial grooves 70. The oil holes 72 function as oil supply holes for supplying the second hydraulic pressure chamber 68 with the working oil. When a centrifugal hydraulic pressure is developed in the first hydraulic pressure chamber 54, the working oil is fed from the side of the input shaft 22 to the second hydraulic pressure chamber 68 through the oil holes 72 and the axial grooves 70, so that the second hydraulic pressure chamber 68 functions as a canceling chamber for canceling the centrifugal hydraulic pressure in the first hydraulic pressure chamber 54. The oil holes 72 also function as exhaust holes of the working oil. The working oil in the second hydraulic pressure chamber 68 is exhausted through oil hole 72 upon supplying of the working oil into the first hydraulic pressure chamber 54. The axial grooves 70 also function as exhaust passages of the working oil. The working oil in the second hydraulic pressure chamber 68 is exhausted also to the space formed outwardly of the balancer wall 60 through axial grooves 70. Accordingly, the resistance derived from the exhaust of the working oil from the second hydraulic pressure chamber 68 reduces.

The second piston 20 is a pressed member and consists of a radially inner portion 20a, a radially outer portion 20b and a connection portion 20c. An axial distance of the radially inner portion 20a from the second frictional coupling elements 14 increases in steps as the radially inner portion 20a extends in the radially outward direction. The radially outer portion 20b is fixed to the radially outer end of the radially inner portion 20a, and an axial distance of the radially outer portion 20b from the second frictional coupling elements 14 decreases in steps as the radially outer portion 20b extends in the radially outward direction. The radially outer end of the radially outer portion 20b is opposed to the second frictional coupling elements 14. The radially inner portion 20a and the radially outer portion 20b are connected through a connection portion 20c having a U-shaped section. The connection portion 20c which connects the radially inner and outer portions 20a, 20b, is slidably received in the annular convex portion 30d. A lip seal 74 of rubber is fixed on the radially outer surface (the surface of the outer drum portion 30 facing to the bottom portion 30b) of the connection portion 20c so that the lip seal 74 seals a space defined by the bottom portion 30b of the outer drum portion 30 and the second piston 20. The inner circumferential end of the second piston 20 is slidable on the input shaft 22. A lip seal 76 of rubber is fixed on the inner circumferential end of the second piston 20 so that the lip seal 76 seals a space defined by the inner circumferential end of the second piston 20 and the input shaft 22, to form a third hydraulic pressure chamber 78 between the second piston 20 and the bottom portion 30b of the outer drum portion 30.

When a working oil is fed to the third hydraulic pressure chamber 78 through an oil hole 80 formed in the input shaft 22, the second piston 20 is moved in the axial direction that causes the second piston 20 is moved away from the annular bottom portion 30b of the outer drum portion 30. As a result, the second piston 20 is brought into pressing contact with the second frictional coupling elements 14. A retainer ring 82 is fixed to the outer cylindrical portion 30c of the outer drum portion 30 such that the retainer ring 82 is located on one side of the second frictional coupling elements 14 which is remote from the second piston 20. The retainer ring 82 is provided to prevent an axial movement of the second frictional coupling elements 14 toward the first frictional coupling elements 12. In this arrangement, the inwardly extending friction plates 38 and outwardly extending friction plates 40 of the second frictional coupling elements 14 are forced against each other when the second frictional coupling elements 14 are pressed by the second piston 20.

On one of opposite axial sides of the second piston 20 which is remote from the annular bottom portion 30b of the outer drum portion 30, there is disposed a balancer wall 84 such that the balancer wall 84 is fitted on the radially outer surface of the input shaft 22. The balancer wall 84 is an annular plate shaped like member substantially perpendicular to the axis of the input shaft 22. A return spring 86 is interposed between the balancer wall 84 and the second piston 20, to bias the balancer wall 84 and the second piston 20 in opposite axial directions away from each other. A retainer ring 88 is fixed to the radially outer surface of the input shaft 22, and the balancer wall 84 is held at its radially inner end in abutting contact with the retainer ring 88, at one of its opposite surfaces of the balancer wall 84 which is remote from the second piston 20. Accordingly, the balancer wall 84 is prevented from moving in the axial direction away from the second piston 20.

A lip seal 90 of rubber is fixed at the radially outer end of the balancer wall 84 so that the lip seal 90 seals a space defined by the balancer wall 84 and the second piston 20 to form a fourth hydraulic pressure chamber 92 between the balancer wall 84 and the second piston 20. The fourth hydraulic pressure chamber 92 functions as a canceling chamber for canceling the centrifugal hydraulic pressure in the third hydraulic pressure chamber 78.

It will be understood from the foregoing description of the present embodiment that since the first piston 18 is slidably fitted on the inner drum portion 26 and the second piston 20 is slidably fitted on the input shaft 22, the inner drum portion 26a can be axially shorter than in a case in which the first and second pistons 18, 22 both are fitted on the inner drum portion 26. Since the inner drum portion 26 and the input shaft 22 are welded to each other, then the axial dimension at the connected part is shorter, the inner drum portion 26 can be axially shorter than in a case in which the inner drum portion 26 is splined to the input shaft 22 as disclosed in the Patent Document 1. Accordingly, the clutch device 10 can be a small-size one.

It will be understood from the foregoing description of the present embodiment that since the first and second welded portions 24, 28 are radially spaced in a predetermined distance and concentric with each other, the connecting part of the input shaft 22 and the inner drum portion 26, and that of the inner drum portion 26 and the outer drum portion 30 can be simultaneously welded. Accordingly, the cost for welding can be reduced.

It will be understood from the foregoing description of the present embodiment that since the inner cylindrical portion 30a of the outer drum portion 30 extends in the same direction as the welding depths of the first and second welded portions 24, 28 extend, detecting defects in the first and second welded portion 24, 28 from the radially outward point with respect to the inner cylindrical portion 30a of the outer drum portion 30 can be accomplished.

It will be understood from the foregoing description of the present embodiment that since the tip portion 104 located at the tip of the defect detecting probe 100 and on the tip side from the ultrasonic output portion 102 can be received in the annular convex portion 30d formed in the annular bottom portion 30b, the inner cylindrical portion 30a of the outer drum portion 30 can be shorter than in a case in which the tip portion 104 is disposed on the radially outwardly of the inner cylindrical portion 30a of the outer drum portion 30.

It will be understood from the foregoing description of the present embodiment that since the lip seal 50 fixed on the outer drum portion 30 seals a space defined by the first piston 18 and the outer drum portion 30, and the lip seals 74, 76 fixed on the second piston 20 seal, respectively, a space defined by the outer drum portion 30 and the second piston 20 and a space defined by the input shaft 22 and the second piston 20, the axial dimensions of the outer drum portion 30 and the second piston 20 can be shorter. Accordingly, the clutch device 10 can be a smaller-size one.

It will be understood from the foregoing description of the present embodiment that since the first piston 18 is slidably received on the outer surface of the annular convex portion 30d of the outer drum portion 30, and the second piston 20 is slidably received on the inner surface of the annular convex portion 30d of the outer drum portion 30, then the first and second pistons 18, 20 are slidably and directly received on the outer and inner surfaces of the clutch drum 30 respectively, the clutch device 10 can be a small-size one.

It will be understood from the foregoing description of the present embodiment that the first and second frictional coupling elements 12, 14 are disposed in the clutch drum 30, each of them is axially spaced in a predetermined distance to each other. The first piston 18 is moved in the axial direction that causes the first piston 18 is moved away from the second piston 20 and, as a result, the first piston 18 is brought into pressing contact with the first frictional coupling elements 12. The second piston 20 is moved in the axial direction that causes the second piston 20 is moved away from the first piston 18 and, as a result, the second piston 20 is brought into pressing contact with the frictional coupling elements 14. Accordingly, with the first and second pistons 18, 20 which are disposed respectively on one and another of the opposed sides of the clutch drum 30, the first and second frictional coupling elements 12, 14 which are disposed in the clutch drum 30, each of them is axially spaced in a predetermined distance to each other, can operate to be coupled.

It will be understood from the foregoing description of the present embodiment that the clutch drum 30 has axial grooves 70 formed in a portion thereof on which the balancer wall 60 is fitted. The axial grooves 70 are formed so as to extend in the axial direction. The working oil in the second hydraulic pressure chamber 68 is exhausted through the axial grooves 70. Therefore, it is not necessary to form a groove on the balancer wall 60 for exhaust of the working oil in the second hydraulic pressure chamber 68. Accordingly, with the resistance derived from the exhaust of the working oil from the second hydraulic pressure chamber 68 reduced, high strength of the balancer wall 60 can be obtained.

It will be understood from the foregoing description of the present embodiment that since the oil holes 72 are open to the axial grooves 70, the axial dimension of the inner drum portion 26 can be shorter than in a case in which the openings of the oil holes 72 are formed as directly open to the second hydraulic pressure chamber 68. Accordingly, the clutch device 10 can be a small-size one.

It will be understood from the foregoing description of the present embodiment that since the lip seal 66 fixed on the first piston 18 seals a space defined by the first piston 18 and the balancer wall 60, the axial dimension of the first piston 18 can be shorter. Accordingly, the clutch device 10 can be a small-size one.

While the present invention has been described in its exemplary embodiment with reference to the drawings, the present invention may be otherwise embodied.

For example, while the rotary shaft is the input shaft 22 in the above-described embodiment, the rotary shaft may be an output shaft or a counter shaft.

While the annular convex portion 30d is formed in the annular bottom portion 30b of the outer drum portion 30 in the above-described embodiment in order to receive the tip portion 104 of the defect detecting probe 100, the outer drum portion 30 may have no annular convex portion 30d when the length of the inner cylindrical portion 30a is not substantially long upon detecting of defects in the case that the tip portion 104 is disposed radially outwardly of the inner cylindrical portion 30a of the outer drum portion 30, for example, the length of the tip portion 104, namely, the distance from the ultrasonic output portion 102 to the tip of the tip portion 104 is substantially short.

While the lip seals 50, 52, 66, 74, 76, 90 are employed for sealing of the first to four hydraulic pressure chambers 54, 68, 78, 92 in the above-described embodiment, other sealing member such as an oil seal may be employed instead of one or a plurality of the lip seals 50, 52, 66, 74, 76, 90 except in the fifth or sixth aspect of the present invention.

It is to be understood that the present invention may be embodied with other changes, improvements, and modifications that may occur to a person skilled in the art without departing from the scope and spirit of the invention defined in the appended claims.

The invention claimed is:

1. A clutch device for an automatic transmission comprising:
a clutch drum, a first frictional coupling elements and a second frictional coupling elements, both of which are supported by the clutch drum, a first piston axially movably disposed radially outwardly of the clutch drum and operating to couple the first frictional coupling elements, a second piston axially movably disposed radially inwardly of the clutch drum and operating to couple the second frictional coupling elements:

wherein the clutch drum includes an inner drum portion welded on a rotary shaft, and an outer drum portion welded on the inner drum portion and supporting the first frictional coupling elements and the second frictional coupling elements;

wherein the first piston is axially slidable on the inner drum portion;

wherein the second piston is axially slidable on the rotary shaft; and wherein a welded portion of the rotary shaft and the inner drum portion, and a welded portion of the inner drum portion and the outer drum portion are radially spaced a predetermined distance from each other and concentric with each other.

2. The clutch device for an automatic transmission according to claim 1, wherein a radially inward end portion of the outer drum portion which is welded on the inner drum portion is formed so as to extend in the axial direction.

3. The clutch device for an automatic transmission according to claim 2, wherein the outer drum portion includes an annular convex portion which is concaved in the axial direction and axially extending from an axial position of radially inward end portions.

4. The clutch device for an automatic transmission according to claim 3, wherein the first piston is slidably received on an outer surface of the annular convex portion of the outer drum portion, and the second piston is slidably received on an inner surface of the annular convex portion of the outer drum portion.

5. The clutch device for an automatic transmission according to claim 1, wherein a lip seal is fixed on the outer drum portion so as to seal a space defined by the outer drum portion and the first piston.

6. The clutch device for an automatic transmission according to claim 1, wherein a lip seal is fixed on the second piston so as to seal a space defined by the second piston and the outer drum portion, and a lip seal is fixed on the second piston so as to seal a space defined by the second piston and the rotary shaft.

7. The clutch device for an automatic transmission according to claim 1, wherein:

the first frictional coupling elements and the second frictional coupling elements are disposed in the clutch drum, and axially spaced a predetermined distance from each other;

the first piston is brought into pressing contact with the first coupling elements when the first piston is axially moved away from the second piston; and the second piston is brought into pressing contact with the second coupling elements when the second piston is moved away from the first piston.

* * * * *